United States Patent
Ohnemus et al.

(10) Patent No.: US 10,759,264 B2
(45) Date of Patent: Sep. 1, 2020

(54) HYBRID TRANSMISSION

(71) Applicant: Bayerische Motoren Werke Aktiengesellschaft, Munich (DE)

(72) Inventors: Ulrich Ohnemus, Hattenhofen (DE); Sebastian Liebert, Unterfoehring (DE); Benjamin Kluge, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 108 days.

(21) Appl. No.: 15/833,412

(22) Filed: Dec. 6, 2017

(65) Prior Publication Data

US 2018/0093559 A1 Apr. 5, 2018

Related U.S. Application Data

(63) Continuation of application No. PCT/EP2016/066266, filed on Jul. 8, 2016.

(30) Foreign Application Priority Data

Jul. 24, 2015 (DE) .................. 10 2015 214 040

(51) Int. Cl.
*B60K 6/365* (2007.10)
*B60K 6/387* (2007.10)
(Continued)

(52) U.S. Cl.
CPC .............. *B60K 6/365* (2013.01); *B60K 6/387* (2013.01); *F16H 3/66* (2013.01);
(Continued)

(58) Field of Classification Search
CPC ..... F16H 2200/2043; F16H 2200/2012; F16H 2200/0052; F16H 3/72; F16H 3/724;
(Continued)

(56) References Cited

U.S. PATENT DOCUMENTS 6,572,507 B1 6/2003 Korkmaz et al.
8,617,022 B1 * 12/2013 Vernon .................. F16H 3/663
475/278
(Continued)

FOREIGN PATENT DOCUMENTS

DE     43 13 289 A1   10/1994
DE     199 12 480 A1   9/2000
(Continued)

OTHER PUBLICATIONS

German-language Office Action issued in counterpart German Application No. 10 2015 214 040.7 dated Feb. 9, 2018 (four (4) pages).
(Continued)

*Primary Examiner* — David R Morris
*Assistant Examiner* — James J Taylor, II
(74) *Attorney, Agent, or Firm* — Crowell & Moring LLP

(57) ABSTRACT

A hybrid planetary gear transmission includes first, second and third planetary gear sets with respective sun, ring and planetary gears, the three planetary gear sets being arranged at a distance from each other concentrically to a common transmission axis, a transmission input shaft for receiving drive power from at least one drive machine, and a transmission output shaft for outputting drive power to a drive train. The hybrid transmission further includes a first coupling system for selectively connecting the transmission input shaft to the sun gear of the first planetary gear set, a second coupling device for selectively connecting the transmission input shaft to the planetary gear carrier of the first planetary gear set, and a connection between the ring gear of the third planetary gear set to the planetary carrier of the second planetary gear set. A sun gear of additional planetary gear set is rotationally mounted with respect to the transmission housing, and a planetary gear carrier of the additional planetary gear set may be connected to a first drive (Continued)

machine and a ring gear of the additional planetary gear set may be connected to a second drive machine, such that drive power can be transferred from the planetary gear carrier of the additional planetary gear set to the transmission input shaft.

13 Claims, 2 Drawing Sheets

(51) Int. Cl.
*F16H 3/66* (2006.01)
*B60K 6/48* (2007.10)
*F16H 3/72* (2006.01)

(52) U.S. Cl.
CPC .......... *B60K 2006/4825* (2013.01); *B60K 2006/4833* (2013.01); *F16H 3/725* (2013.01); *F16H 2200/0052* (2013.01); *F16H 2200/201* (2013.01); *F16H 2200/2012* (2013.01); *F16H 2200/2043* (2013.01); *F16H 2200/2064* (2013.01); *F16H 2200/2094* (2013.01); *F16H 2200/2097* (2013.01); *Y02T 10/6221* (2013.01); *Y02T 10/6252* (2013.01)

(58) Field of Classification Search
CPC ..... F16H 3/725; F16H 2200/201; B60K 6/36; B60K 6/365; B60K 6/48; B60K 6/485; B60K 2006/4808; B60K 2006/4816; B60K 2006/4825; B60K 2006/4833; B60K 2006/4841; B60Y 2200/92; Y02T 10/62; Y02T 10/6221; Y02T 10/6226; Y02T 10/6247; Y02T 10/6252; Y02T 10/6256; Y02T 10/626; Y10S 903/911; Y10S 903/919
See application file for complete search history.

(56) References Cited

U.S. PATENT DOCUMENTS

| | | |
|---|---|---|
| 2010/0069191 A1 | 3/2010 | Swales et al. |
| 2011/0263370 A1 | 10/2011 | Borntraeger et al. |
| 2012/0178567 A1 | 7/2012 | Schoenek et al. |
| 2012/0178573 A1 | 7/2012 | Hart et al. |
| 2012/0220403 A1 | 8/2012 | Reichert et al. |
| 2014/0221142 A1 | 8/2014 | Borgerson et al. |

FOREIGN PATENT DOCUMENTS

| | | |
|---|---|---|
| DE | 10 2008 040 499 A1 | 1/2010 |
| DE | 10 2008 041 887 A1 | 3/2010 |
| DE | 10 2009 041 207 A1 | 9/2010 |
| DE | 10 2009 046 366 A1 | 5/2011 |
| DE | 10 2012 000 249 A1 | 7/2012 |
| DE | 10 2014 101 137 A1 | 8/2014 |

OTHER PUBLICATIONS

International Search Report (PCT/ISA/210) issued in PCT Application No. PCT/EP2016/066266 dated Sep. 28, 2016 with English translation (Six (6) pages).
German-language Written Opinion (PCT/ISA/237) issued in PCT Application No. PCT/EP2016/066266 dated Sep. 28, 2016 (Eight (8) pages).
German-language Office Action issued in counterpart German Application No. 10 2015 2014 040.7 dated Apr. 4, 2016 (Six (6) pages).
Chinese-language Office Action issued in counterpart Chinese Application No. 201680028575.1 dated Aug. 26, 2019 with English translation (20 pages).

* cited by examiner

| Gang | 10 | 11 | 9 | 7 | 8 |
|---|---|---|---|---|---|
| R | X |  |  |  | X |
| 1 | X | X |  |  |  |
| 2 |  | X | X |  |  |
| 3 |  | X |  |  | X |
| 4 |  | X |  | X |  |
| 5 |  |  |  | X | X |
| 6 |  |  | X | X |  |

HYBRID TRANSMISSION

CROSS REFERENCE TO RELATED APPLICATIONS

This application is a continuation of PCT International Application No. PCT/EP2016/066266, filed Jul. 8, 2016, which claims priority under 35 U.S.C. § 119 from German Patent Application No. 10 2015 214 040.7, filed Jul. 24, 2015, the entire disclosures of which are herein expressly incorporated by reference.

BACKGROUND AND SUMMARY OF THE INVENTION

The invention relates to a hybrid transmission in the form of a multi-stage planetary transmission comprising at least three planetary gear sets. Hybrid transmissions of this type are known from the general prior art; in particular, DE 43 13 289 A1 is concerned with transmissions of this type.

Internal combustion engines for driving motor vehicles, and electric motors for the same purpose have different rotational speed/torque characteristics. While electric motors can generally output their maximum torque from a rotational speed of zero, i.e. virtually from a standstill, internal combustion engines require higher rotational speeds in order to achieve this. In hybrid vehicles, internal combustion engines and electric motors are used for jointly driving motor vehicles. In particular for the above reasons, special requirements are imposed on transmission devices for combining said drive machines such that a well-performing and efficient drive can be provided over the entire rotational speed range.

As stated, these differences in the rotational speed/torque performance characteristics of the joint drive machines and the combination of the latter by a transmission, as compared to a pure internal combustion engine drive, give rise to different requirements being imposed on a hybrid transmission than on a transmission which is drivable exclusively by an internal combustion engine.

DE 43 13 289 A1 provides a multi-stage planetary transmission in which different transmission ratio stages (gears) can be provided by three planetary gear sets, by different couplings of the transmission elements. The output from said transmission takes place via the planet carrier of one of the three planetary gear sets.

It is an object of the invention to provide an efficient hybrid transmission designed as a planetary gear for a hybrid drive train.

A hybrid transmission according to the invention is designed as a planetary transmission. Furthermore, such a hybrid transmission has a first, a second and a third planetary gear set, and also a further planetary gear set, with a respective sun gear, a ring gear and at least one, preferably a plurality of, planetary gears which can be mounted on a planet carrier. Said planetary gear sets can preferably be accommodated and mounted in a single-part or preferentially multi-part transmission housing.

The planetary gear sets are preferably arranged concentrically with respect to a common transmission axis and, furthermore preferably, the drive and the output for said hybrid transmission take place coaxially, preferentially concentrically, with respect to said transmission axis. Furthermore preferably, at least two and preferentially all of the planetary gear sets are arranged spaced apart from one another in the axial direction along said transmission axis.

Furthermore preferably, the hybrid transmission has a transmission input shaft for receiving driving power from at least one drive machine, or from said further planetary gear set, and a transmission output shaft, for outputting driving power to a drive train. The hybrid transmission preferably has at least one first coupling device for selectively connecting the transmission input shaft to the sun gear of the first planetary gear set via a sixth transmission shaft, and at least one second coupling device for selectively connecting the transmission input shaft to the planet carrier of the first planetary gear set via a fourth transmission shaft. Furthermore preferably, the ring gear of the second planetary gear set is connectable to the planet carrier of the first planetary gear set. The sun gear of the second planetary gear set is preferably connectable to the transmission input shaft via a first transmission shaft, and the sun gear is preferentially connected to said transmission shaft. The planet carrier of the third planetary gear set is connectable to the transmission output shaft by a second transmission shaft.

Within the context of the invention, a drive shaft should be understood as meaning a shaft to which driving power can be supplied both from the first drive machine and from the second drive machine. With respect to the transmission of torque from said drive machines to the transmission input shaft, the drive shaft is arranged between the drive machines and the transmission input shaft.

Furthermore preferably, the drive shaft is indirectly or directly connectable via a further coupling device to at least one of the drive machines, in particular at least the first drive machine, preferably an internal combustion engine. Said further coupling device is preferably designed as a starting clutch, preferentially as a torque converter, preferably having a converter lockup clutch, and particularly preferentially as a multi-disk clutch, preferably wet-running and preferentially dry-running.

Furthermore preferably, said further coupling device is arranged between the power-transmitting drive machine and the drive shaft in the direction of the transmission of torque from the former to the latter, preferentially between the first drive machine and the drive shaft. In particular by said coupling device, the power flux from the first drive machine to the transmission input shaft can be interrupted, and therefore a preferably purely electric drive is made possible by the second drive machine.

In this context, an indirect connection of the drive machines to the transmission input shaft should be understood as meaning that a transmission device, in particular for converting rotational speed and torque, is provided in the direction of the transmission of torque between the power-transmitting drive machine and the transmission input shaft, and, additionally or alternatively, a device is arranged for reducing vibrations, preferably a single-mass, dual mass or multi-mass flywheel. Furthermore preferably, a device of this type for reducing vibrations has a centrifugal pendulum. A multiplicity of devices for reducing vibrations are known from the prior art.

Within the context of the invention, the connection of one of the drive machines to the transmission input shaft should be understood as meaning that driving power (rotational speed and torque) can be output by the connected drive machine to the transmission input shaft. Said driving power can preferably also be at least partially or completely supplied to the further planetary gear set and can be transmitted by the latter to the transmission input shaft.

The transmission input shaft is preferably connectable to the planet carrier of the further planetary gear set by the drive shaft. Furthermore preferably, a driving power (rotational speed, torque) can be supplied, at least by the first drive machine, to the transmission input shaft via a sixth coupling device and preferably via the drive shaft. The planet carrier of the further planetary gear set is preferably designed as a drive shaft, or is connectable to such a drive shaft, and is preferentially connected to the latter.

The sixth coupling device is preferably designed as a separating clutch, with respect to the transmission of torque, between the internal combustion engine and the further planetary gear set. The sixth coupling device is preferably designed as a starting element, preferably as a wet-running, or preferentially, as a dry-running multi-disk clutch. Furthermore preferably, the sixth coupling device is designed as a torque converter.

The sixth coupling device preferably has at least one interlocking element, preferably a multiplicity of interlocking elements. An interlocking element should be understood as meaning in particular an element for the interlocking transmission of torque, said element being able to be selectively engaged and disengaged. An interlocking element of this type is preferably designed as a claw, preferentially a claw clutch or, particularly preferentially, as a sliding sleeve. Furthermore preferably, said coupling device is designed as a frictionally engaging/interlocking element.

In particular the planetary gear set, the sun gear of which and preferably the planet carrier of which are connectable, in particular selectively, to the transmission input shaft is regarded as the first planetary gear set.

In particular the planetary gear set, the sun gear of which is connectable and is preferably connected to the transmission input shaft, is regarded as the second planetary gear set.

In particular the planetary gear set, via the planet carrier of which the output from the planetary transmission takes place and which is furthermore preferably not connectable, preferably directly, to the transmission input shaft by a coupling device is regarded as the third planetary gear set.

In particular a planetary gear set which is connectable to a first and a second drive machine and has a sun gear which is stationary, i.e. is mounted in a manner fixed on the housing, should be understood to be a further planetary gear set.

Driving power can preferably be transmitted to the transmission input shaft indirectly from at least one of the drive machines.

Within the context of the invention, an indirect transmission of the driving power to the transmission input shaft from at least one of the drive machines (first, second drive machine; internal combustion engine, electromechanical energy converter), preferably the second drive machine, should be understood as meaning that at least one further transmission device, preferably a gear transmission and, particularly preferentially, the further planetary gear set is arranged in the direction of transmission of torque from one of said drive machines to the transmission input shaft. Furthermore preferably, said further transmission device is arranged geometrically between the first drive machine and the second drive machine. Furthermore preferably, the second drive machine surrounds said further transmission device in the radial direction.

Driving power can preferably be transmitted directly to the transmission input shaft from at least one drive machine, preferably from the first drive machine. In this context, a direct transmission of the driving power should be understood as meaning that at least one of the drive machines, preferably the first drive machine, can be coupled to the drive shaft with a direct through-drive by the further planetary gear set. The first drive machine is preferably connectable to the planet carrier of the further planetary gear set, and said drive machine is preferably connected to said planet carrier. In the case of a through-drive of this type by the further planetary gear set, a transmission of driving power between the first and the second drive machine is preferably made possible, in particular via the planet carrier of said planetary gear set. Furthermore preferably, the first drive machine is connectable to the drive shaft and the latter is connectable to the transmission input shaft.

Furthermore preferably, said gear transmission, preferably the further planetary gear set, is configured to accumulate a driving power which can be provided by the internal combustion engine and a driving power which can be provided by the electromechanical energy converter and to output said driving power to the transmission input shaft, preferably selectively, by the sixth coupling device. The further planetary gear set is preferably designed here in such a manner that the sun gear can be mounted non-rotatably in relation to the transmission housing and, in at least one operating state, when the sun gear of the further planetary gear set is at a standstill, driving power can be transmitted to the transmission input shaft.

Investigations have shown that a particularly favorable transmission ratio range for the hybrid transmission and a high degree of efficiency for said multi-stage planetary transmission are achievable if the latter is constructed in the manner described above.

In a preferred embodiment of the hybrid transmission, the ring gear of the first planetary gear set is connectable to the planet carrier of the third planetary gear set. The ring gear of the first planetary gear set is preferably permanently connected to the planet carrier of the third planetary gear set. Particularly efficient operation of the hybrid transmission is made possible in particular by this coupling of the ring gear of the first planetary gear set to the planet carrier of the third planetary gear set, and therefore preferably also to the transmission output shaft.

In a preferred embodiment, the sun gear of the third planetary gear set is selectively connectable to the transmission housing by a third coupling device via a fifth transmission shaft. The third second planetary gear set is preferably arranged in the axial direction between the first and the third planetary gear set, and therefore the third planetary gear set is particularly readily accessible and is thus easily accessible for said selective connection.

In a preferred embodiment, the ring gear of the second planetary gear set is connected to the planet carrier of the first planetary gear set by a fourth transmission shaft and is preferably selectively connectable to the transmission input shaft by the second coupling device. Furthermore preferably, the fourth transmission shaft is designed, at least in portions, as a hollow shaft and is arranged concentrically with respect to the transmission axis. Furthermore preferably, the transmission shaft for connecting the sun gear of the first planetary gear set to the first coupling device (sixth transmission shaft) is also designed at least in portions as a hollow shaft as is arranged concentrically with respect to the transmission axis. Furthermore preferably, the fourth and the sixth transmission shaft (hollow shafts) cover the first transmission shaft. In particular, such a design of the hybrid transmission permits a particularly space-saving construction of said transmission.

In a preferred embodiment of the hybrid transmission, the planet carrier of the first planetary gear set is selectively connectable to the transmission housing by a fourth coupling device, in particular by the fourth transmission shaft. In particular, the first planetary gear set is particularly readily accessible, or activatable, by its axial positioning in relation to the second planetary gear set, and a particularly space-saving and simple construction is made possible.

In a furthermore preferred embodiment, the fourth coupling device is designed as a brake, in particular for the selective connection of transmission housing and planet carrier of the first planetary gear set. Said brake preferably has at least one frictionally engaging element, preferentially at least one interlocking element and, particularly preferentially, at least one frictionally engaging element and one interlocking element. At least a portion of the torque, or preferably all of the torque, can be transmitted between the planet carrier of the first planetary gear set and the transmission housing by an interlocking connection, in particular by an interlocking element. In particular with interlocking elements, particularly high forces can be transmitted in a small construction space, in comparison to frictionally engaging elements. Furthermore preferably, the fourth coupling device is designed as a frictionally engaging/interlocking element.

In a preferred embodiment of the hybrid transmission, the sun gear of the first planetary gear set is selectively connectable to the transmission housing by a fifth coupling device. Therefore, the sixth transmission shaft is preferably coupleable to the transmission housing, and said transmission shaft can therefore be set to a rotational speed of zero in order to change the transmission ratio. In particular, the first planetary gear set is particularly easily accessible for the activation, and therefore a particularly space-saving construction of the hybrid transmission is made possible.

In a preferred embodiment of the hybrid transmission, the sun gear of the second planetary gear set is connectable to the transmission input shaft. The sun gear of the second planetary gear set is preferably connected non-rotatably to the transmission input shaft by the first transmission shaft. The first transmission shaft is preferably connected to the transmission input shaft in an interlocking manner, preferentially in a frictionally engaging manner and, particularly preferentially, in an integrally bonded manner, and, furthermore preferably, by a combination of at least two of the types of connection mentioned. The transmission input shaft is preferably designed as a partial region of the first transmission shaft. In particular with the direct, non-rotatable connection of the sun gear of the second planetary gear set to the transmission input shaft, particularly efficient operation of the hybrid transmission is made possible.

In a preferred embodiment of the hybrid transmission, the transmission input shaft is selectively connectable, preferably indirectly, to at least one drive machine by the sixth coupling device in such a manner that the driving power can be supplied to the transmission input shaft from said drive machine, preferably via the drive shaft.

Said sixth coupling device should preferably be understood as meaning a frictionally engaging coupling device. Furthermore preferably, said coupling device is designed as a multi-disk clutch, preferably as a dry-running and preferentially as a wet-running multi-disk clutch. Said sixth coupling device is preferably designed as a starting element. In particular, a starting element is configured to permit the starting of the motor vehicle from a standstill, in particular if driving power is supplied from an internal combustion engine. Starting elements of this type are known from the prior art. A particularly efficient operation of the hybrid transmission is made possible in particular by the use of a starting element.

In a preferred embodiment, said sixth coupling device is designed as a selectable multi-disk clutch or preferably as a torque converter, preferably having a converter lockup clutch, for transmitting the driving power from the drive shaft to the transmission input shaft.

Furthermore preferably, the coupling device for selectively connecting the sun gear of the third planetary gear set to the transmission housing (third coupling device) is designed as a brake. Preferably as a frictionally engaging brake and preferentially as an interlocking brake, and, particularly preferentially, said brake has claws which intermesh in order to transmit torque. Furthermore preferably, said brake is designed as a frictionally engaging/interlocking element of the previously described type, in particular what is referred to as synchronization. In particular using a frictionally engaging/interlocking element, actuation of said coupling device despite rotating transmission shafts and a particularly high degree of efficiency are made possible by an interlocking connection.

In a preferred embodiment of the hybrid transmission, a sixth coupling device is arranged, with respect to the transmission of torque, between the planet carrier of the further planetary gear set and the first drive machine. Said coupling device is preferably designed as a separating clutch with which the transmission of torque from the first drive machine, which is preferably designed as an internal combustion engine, to the transmission input shaft and preferably to the planet carrier of the further planetary gear set, can be interrupted. Furthermore preferably, said separating clutch is designed as a multi-disk clutch with at least one, preferably, with at least two disks. Furthermore preferably, the sixth coupling device is arranged outside a lubricant container of the further planetary gear set and is preferentially designed as a dry-running multi-disk clutch. The sixth multi-disk clutch is preferably arranged within the lubricant container of the further planetary gear set and is preferably designed as a wet-running multi-disk clutch. In particular, the first drive machine can be decoupled from the hybrid transmission by the sixth coupling device, and therefore the drag torques can be reduced in particular in the overrun mode of the drive.

In a preferred embodiment of the hybrid transmission, a vibration reducer is arranged between the drive machine and the further planetary gear set with respect to the transmission of torque from the first drive machine to the further planetary gear set. Said vibration reducer is preferably designed as a vibration absorber or vibration damper or as a combination of the two. Furthermore preferably, the vibration reducer is designed as a single mass, dual mass or multimass flywheel or has such a flywheel. The vibration reducer preferably has a single or preferentially a plural centrifugal pendulum. The vibration reducer is preferably arranged between the sixth coupling device and the first drive machine with respect to the transmission of torque from the first drive machine to the further planetary gear set.

Furthermore preferably, no such vibration reducer is provided between the first drive machine and the third planetary gear set. Furthermore preferably, rotational irregularities, in particular rotational irregularities applied by the first drive machine, can be reduced by the second drive machine, in particular by application of antiphase rotational irregularities.

In a preferred embodiment, the planetary gear set is designed as a plus transmission, preferably as a minus transmission. The planetary gear set preferably has a static transmission ratio, the value of which is preferably greater than 1, is preferably greater than 1.25 and is preferentially greater than 1.5. Furthermore, said range is smaller than 2.5, preferably smaller than 2.1 and preferentially smaller than 1.8 and, very particularly preferentially, said value of the static transmission ratio is at least substantially 1.65. Within the context of this invention, at least substantially should be understood here as meaning a region of +/−0.1, preferably of +/−0.5.

In a preferred embodiment, the further planetary gear set is accommodated in a housing module. Said housing module is preferably, at least substantially, formed integrally with the transmission housing. Preferably, the further planetary gear set, and preferentially the further planetary gear set and an electromechanical energy converter (second drive machine) which is connected to the ring gear of the further planetary gear set, is/are accommodated in said housing module. A particularly space-saving construction is made possible in particular by the integral design of the transmission housing and of the housing module. It is therefore in particular made possible to separate the further planetary gear set and preferably the second drive machine, and preferentially also the sixth coupling device from the transmission housing (not formed integrally with the transmission housing) or to integrate same in said transmission housing (formed integrally with the transmission housing). Furthermore preferably, simplified sealing of the hybrid transmission can be achieved in the event that the housing module and the transmission housing are formed integrally with each other.

In a preferred embodiment, the further planetary gear set is accommodated in a housing module. Said housing module is preferably of multi-part design in relation to the transmission housing and, furthermore preferably, is connected to the latter via a releasable connection. Preferably, the further planetary gear set, and preferentially the further planetary gear set and an electromechanical energy converter (second drive machine) which is connected to the ring gear of the further planetary gear set, is/are accommodated in said housing module. A particularly maintenance-friendly construction is made possible in particular by the multi-part configuration of the transmission housing and of the housing module.

Preferably, at least one of the coupling devices, preferably a plurality of the coupling devices and preferentially all of the coupling devices is/are selected from a group of coupling devices which have at least the following elements:
multi-disk clutch/brake,
jaw clutch/brake,
band brake,
claw clutch/brake,
sliding sleeve,
synchronization,
selectable and/or non-selectable freewheeling clutch/brake,
or a combination of at least two of the elements mentioned above.

Within this context, synchronization should be understood as meaning a coupling device which initially compensates for a difference in rotational speed between two components to be coupled (preferably gear wheel/gear wheel, shaft/shaft, shaft/gearwheel, gear wheel/housing, shaft/housing), in particular using a frictionally engaging connection, and, chronologically after the production of the frictional engagement, transmits a greater torque between said two components by with an interlocking contact. Synchronizations of this type are also known from the prior art, in particular in the form of single or plural conical synchronizations. Synchronization of this type can preferably be regarded as a frictionally engaging/interlocking element.

The hybrid transmission according to the invention is preferably accommodated in a hybrid drive train of a motor vehicle, in particular of a passenger vehicle. A hybrid drive train of this type has a hybrid transmission of the previously described type. Furthermore, such a hybrid drive train has an internal combustion engine as first drive machine and an electromechanical energy converter as second drive machine. Furthermore, a shaft is provided in said hybrid drive train, with which shaft driving power can be transmitted from said hybrid transmission, in particular from the transmission output shaft thereof, to at least one, preferably to a plurality of, drivable wheels of the hybrid vehicle. A particularly efficient hybrid drive train can be produced in particular by a hybrid transmission according to the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figures 1, 2:
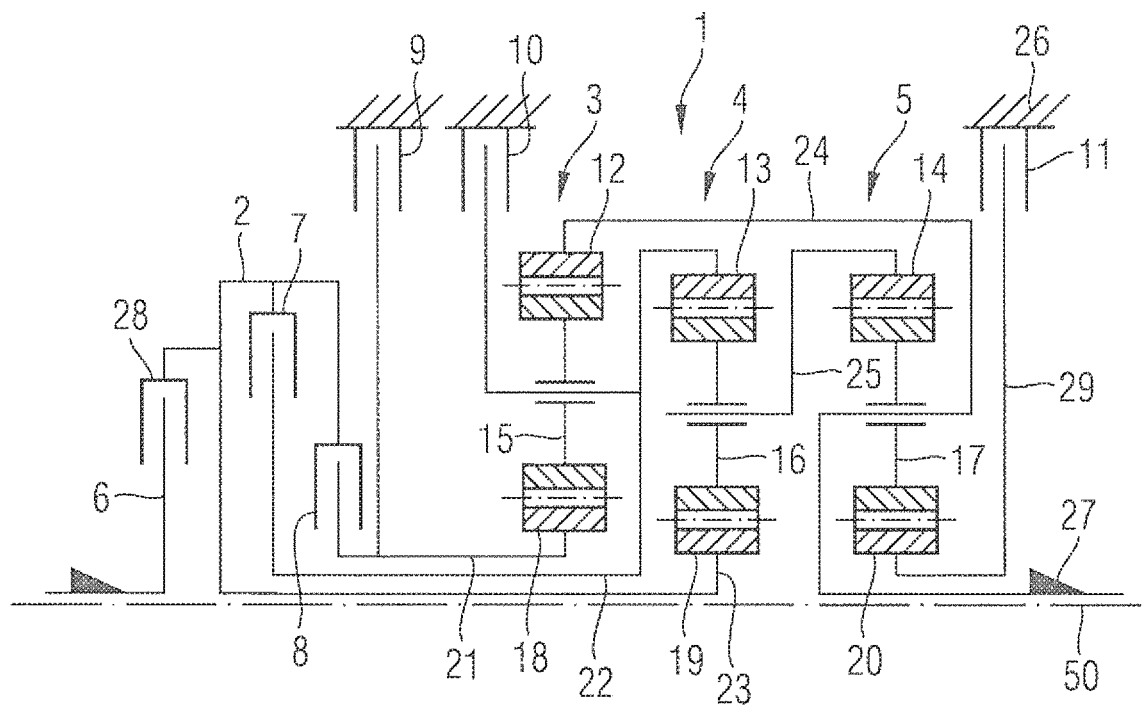
FIG. 1 shows a longitudinal section through the hybrid transmission in accordance with an embodiment of the present invention without a further planetary gear set.
FIG. 2 shows a schematic circuit diagram for the hybrid transmission of FIG. 1.

FIG. 1 illustrates a hybrid transmission 1 without the further planetary gear set. Driving power can be supplied to the transmission input shaft 2 said transmission 1 via the drive shaft 6. For the supply of such a driving power from an internal combustion engine, an electromechanical energy converter or from both, the further coupling device 28 is closed; said coupling device 28 is designed here as a starting element.

Furthermore, the transmission input shaft 2 has a first coupling device 8 and a second coupling device 7. These two coupling devices (7, 8) are designed as multi-disk clutches. The first coupling device 8 is provided to selectively connect the transmission input shaft 2 to the sun gear 18 of the first planetary gear set 3 via the transmission shaft 21. Furthermore, the second coupling device 7 is configured to connect the ring gear 13 of the second planetary gear set 4 to the transmission input shaft 2 in a torque-conducting manner via the transmission shaft 22. Furthermore, the planet carrier of the first planetary gear set 3 is connected to the ring gear 13 of the second planetary gear set 4 via the transmission shaft 22.

The planetary gears 15 of the first planetary gear set 3 are mounted rotatably on said planet carrier of the first planetary gear set 3. Furthermore, said planet carrier is selectively connectable to the transmission housing 26 via the fourth coupling device 10. Said fourth coupling device 10 is designed as a frictionally engaging/interlocking element.

The transmission shaft 21 is designed in such a manner that the sun gear 18 of the first planetary gear set 3 is selectively connectable to the transmission housing 26 using the fifth coupling device 9.

The planet carrier of the second planetary gear set 4 is connected to the ring gear 14 of the third planetary gear set 5 via the transmission shaft 25. Furthermore, the planetary gears 16 are mounted rotatably on the planet carrier of the second planetary gear set 4. The sun gear 19 of the second planetary gear set 4 is connected in a torque-conducting manner to the transmission input shaft 2 via the transmission shaft 23.

The planetary gears 17 of the third planetary gear set 5 are mounted rotatably on the planet carrier of said planetary gear set. The sun gear 20 of the third planetary gear set 5 is selectively connectable to the transmission housing 26 by a transmission shaft 29 with the third coupling device 11. Via the transmission shaft 24, the planet carrier of the third planetary gear set 5 is connected to the ring gear 12 of the first planetary gear set 3, and therefore said ring gear 12 and the planet carrier have the same rotational speed. The transmission shaft 24 is connected to the transmission output shaft 27.

FIG. 2 indicates a schematic circuit diagram for the hybrid transmission illustrated in FIG. 1 without the further planetary gear set. The first line of the table depicted specifies the reference number of the coupling device which has to be activated in order to engage the gear indicated in the first column of said table. An "X" here means that a torque can be transmitted via the respective coupling device (10, 11, 9, 7, 8, see first line). Accordingly, in order to engage the reverse gear, the latter is indicated by R, the fourth coupling device 10 and the first coupling device 8 are activated.

In order to engage the first gear, the fourth coupling device 10 and the third coupling device 11 are in turn activated. In order to engage the second gear, the third coupling device 11 remains activated, and the fifth coupling device 9 is activated. In order to engage the third gear, the third coupling device 11 remains activated and the first coupling device 8 is likewise activated. In order to engage the fourth gear, the third coupling device 11 continues to remain activated and the second coupling device 7 is likewise activated. In order to engage the fifth gear, the second coupling device 7 remains activated and the first coupling device 8 is activated. In order to engage the sixth gear, the second coupling device 7 remains activated and the fifth coupling device 9 is activated.

The coupling devices not referred to in each case as "activated" are deactivated and, apart from unavoidable drag torques, torques are not transmitted by them.

Figure 3:
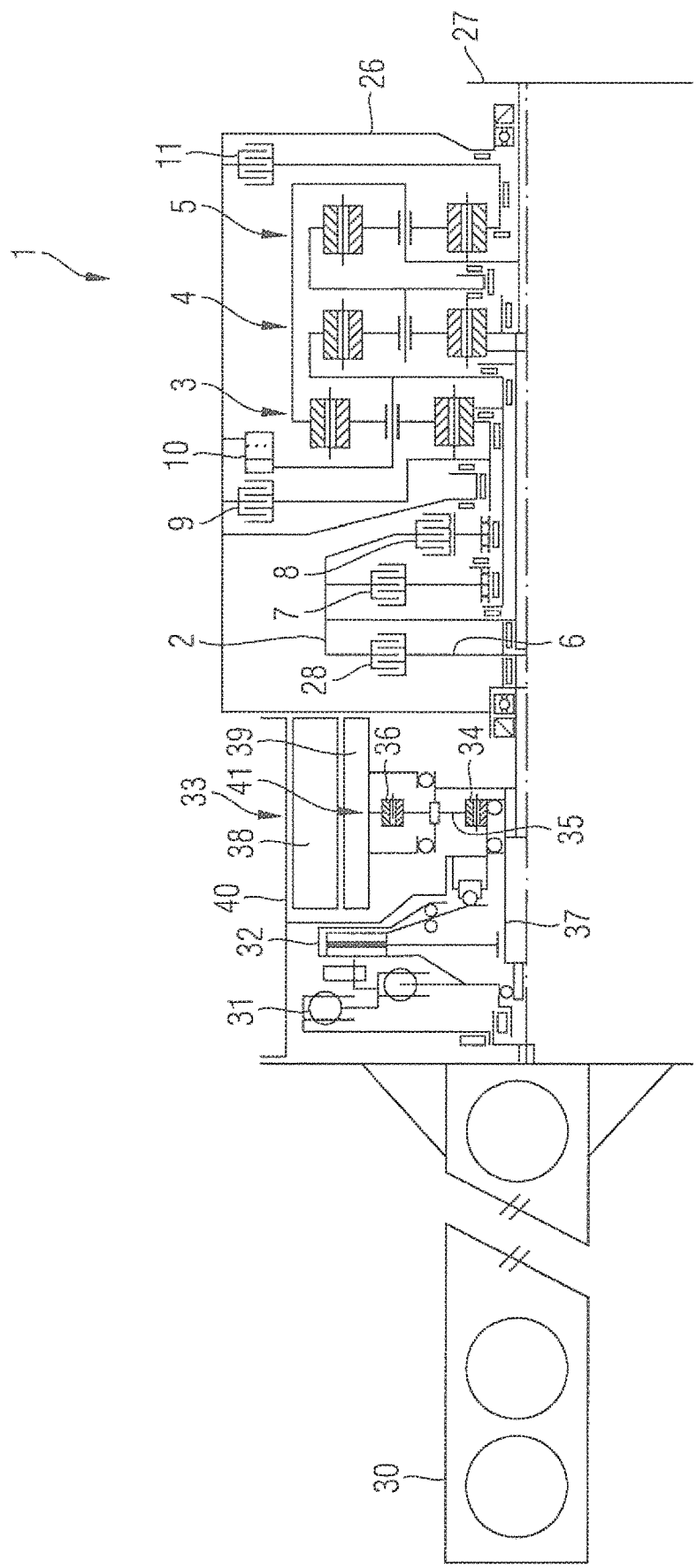
FIG. 3 shows a longitudinal section through the hybrid transmission of FIG. 1 with drive machines and with a further planetary gear set.

FIG. 3 shows a hybrid drive module in schematized form in a sectional illustration. This hybrid transmission has an internal combustion engine 30 as the first drive machine. The hybrid transmission has an electromechanical energy converter 33 with a stator 38 and a rotor 39 as the second drive machine. The stator 38 is accommodated in the housing module 40 for rotation therewith. The rotor 39 is connected to the sun gear 36 of the further planetary gear set 41 for rotation therewith. The planetary gears 35 of the further planetary gear set 41 are mounted rotatably on the planet carrier of said planetary gear set and said planet carrier is connected to the coupling shaft 37 for rotation therewith. The coupling shaft 37 is connectable to the drive shaft 6 for rotation therewith. The sun gear 34 of the further planetary gear set 41 is connected to the housing module 40 for rotation therewith.

Driving power which is provided by the internal combustion engine 30 is transmitted to the separating clutch 32 via the dual mass flywheel 31. If the internal combustion engine is intended to output driving power to the further planetary gear set 41, the separating clutch 32 has to be closed.

For a purely electric driving mode, the separating clutch 32 is opened, the electromechanical energy converter 33 then drives the ring gear 36 of the further planetary gear set 41, and also the planetary gears 35 and the planet carrier of the further planetary gear set 41, and therefore the drive shaft 6, via the rotor 39.

The transmission part 1 (hybrid transmission without the further planetary gear set 41) has the coupling devices 28, 7, 8, 9, 10, 11 in order selectively to control the first planetary gear set 3, the second planetary gear set 4 and the third planetary gear set 5. The housing module 40 is connectable to the transmission housing 26. The output from the hybrid transmission takes place via the transmission output shaft 27.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A hybrid transmission, comprising:
   first, second and third planetary gear sets, each planetary gear set having a sun gear, a ring gear and at least one planetary gear carried on a planet carrier;
   a transmission input shaft configured to receive driving power from at least one drive machine;
   a transmission output shaft configured to output driving power to a drive train;
   first, second, third, fourth and fifth coupling devices;
   a transmission housing having a common transmission axis on which the planetary gear sets are arranged concentrically and spaced apart from one another; and
   a further planetary gear set,
   wherein
      the first coupling device is configured to selectively couple the transmission input shaft to the sun gear of the first planetary gear set,
      the second coupling device is configured to selectively couple the transmission input shaft the ring gear of the second planetary gear set and the planet carrier of the first planetary gear set to the transmission input shaft,
      the ring gear of the third planetary gear set is configured to be coupled to the planet carrier of the second planetary gear set,
      the ring gear of the first planetary gear set is connectable to the planet carrier of the third planetary gear set,
      a sun gear of the further planetary gear set is arranged non-rotatably relative to the transmission housing,
      a planet carrier of the further planetary gear set is configured to be selectively coupled to a first drive machine of the at least one drive machine,
      a ring gear of the further planetary gear set is configured to be selectively coupled to a second drive machine of the at least one drive machine,
      the further planetary gear set is configured to transfer driving power from the planet carrier of the further planetary gear set to the transmission input shaft,
      the third coupling device is configured to selectively couple the sun gear of the third planetary gear set to the transmission housing,
      the fourth coupling device is a brake configured as a friction and form-locking element to selectively positively connect the planet carrier of the first planetary gear set to the transmission housing, the fifth coupling device is configured to selectively couple the sun gear of the first planetary gear set to the transmission housing,
the sun gear of the second planetary gear set is selectably connectable to the transmission input shaft, and
at least one of the first, second and third coupling devices is a multi-plate clutch or a brake.

2. The hybrid transmission as claimed in claim 1, further comprising:
a further coupling device configured to selectively couple the transmission input shaft to a drive shaft to deliver driving power to the transmission, and
the drive shaft is connectable to the planet carrier of the further planetary gear set.

3. The hybrid transmission as claimed in claim 2, wherein the further coupling device is a selectable multi-disk clutch configured to transmit driving power from the drive shaft to the transmission input shaft.

4. The hybrid transmission as claimed in claim 3, wherein the first drive machine is an internal combustion engine.

5. The hybrid transmission as claimed in claim 4, wherein the second drive machine is an electromechanical energy converter.

6. The hybrid transmission as claimed in claim 5, further comprising:
a sixth coupling device arranged between the planet carrier of the further planetary gear set and the first drive machine, the sixth coupling device being a separating clutch configured to interrupt transmission of driving power from the first drive machine to the planet carrier of the further planetary gear set.

7. The hybrid transmission as claimed in claim 6, further comprising:
a vibration reducer arranged between the planet carrier of the further planetary gear set and the first drive machine.

8. The hybrid transmission as claimed in claim 7, wherein the further planetary gear set has a static transmission ratio greater than 1 and less than 2.5.

9. The hybrid transmission as claimed in claim 8, wherein the further planetary gear set is arranged in a housing module which is substantially formed integrally with the transmission housing.

10. The hybrid transmission as claimed in claim 8, wherein
the further planetary gear set is arranged in a housing module which is formed separately from, and is connectable to, the transmission housing.

11. The hybrid transmission as claimed in claim 7, wherein
the further planetary gear set has a static transmission ratio greater than 1.25 and less than 2.1.

12. The hybrid transmission as claimed in claim 7, wherein
the further planetary gear set has a static transmission ratio greater than 1.5 and less than 1.8.

13. A hybrid drive train, comprising:
a hybrid transmission having
first, second and third planetary gear sets, each planetary gear set having a sun gear, a ring gear and at least one planetary gear carried on a planet carrier,
a transmission input shaft configured to receive driving power from at least one drive machine,
a transmission output shaft configured to output driving power to a drive train,
first, second, third, fourth and fifth coupling devices,
a transmission housing having a common transmission axis on which the planetary gear sets are arranged concentrically and spaced apart from one another, and
a further planetary gear set,
wherein
the first coupling device is configured to selectively couple the transmission input shaft to the sun gear of the first planetary gear set,
the second coupling device is configured to selectively couple the ring gear of the second planetary gear set and the planet carrier of the first planetary gear set to the transmission input shaft,
the ring gear of the third planetary gear set is configured to be coupled to the planet carrier of the second planetary gear set,
the ring gear of the first planetary gear set is connectable to the planet carrier of the third planetary gear set,
a sun gear of the further planetary gear set is arranged non-rotatably relative to the transmission housing,
a planet carrier of the further planetary gear set is configured to be selectively coupled to a first drive machine of the at least one drive machine,
a ring gear of the further planetary gear set is configured to be selectively coupled to a second drive machine of the at least one drive machine,
the further planetary gear set is configured to transfer driving power from the planet carrier of the further planetary gear set to the transmission input shaft,
the third coupling device configured to selectively couple the sun gear of the third planetary gear set to the transmission housing,
the fourth coupling device is a brake configured as a friction and form-locking element to selectively positively connect the planet carrier of the first planetary gear set to the transmission housing,
the fifth coupling device is configured to selectively couple the sun gear of the first planetary gear set to the transmission housing,
the sun gear of the second planetary gear set is selectably connectable to the transmission input shaft,
at least one of the first, second and third coupling devices is a multi-plate clutch or a brake,
at least one shaft configured to transmit driving power from the hybrid transmission to a drivable wheel, and
the first drive machine is an internal combustion engine and the second drive machine is an electromechanical energy converter.

* * * * *